Figure 1:
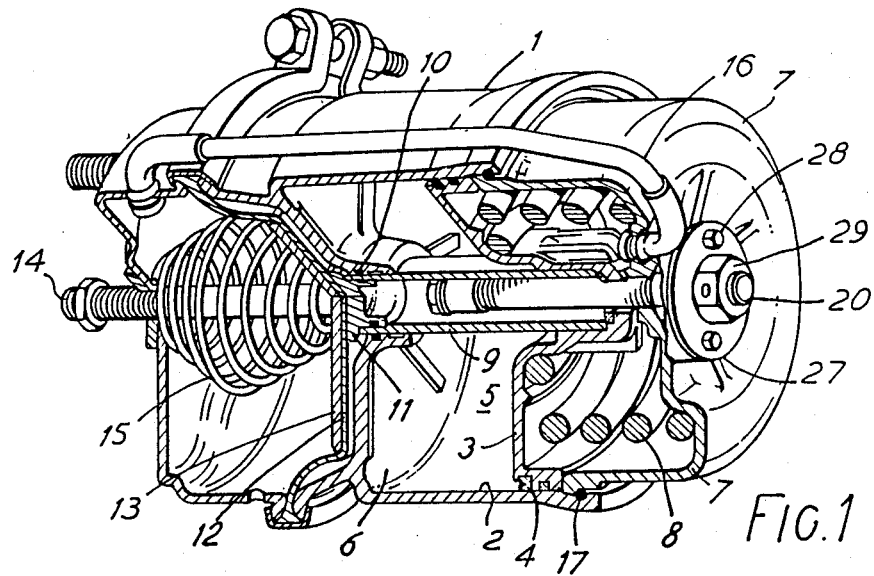

United States Patent [19]

Neal

[11] Patent Number: 4,907,496
[45] Date of Patent: Mar. 13, 1990

[54] SPRING FORCE ACTUATORS

[75] Inventor: Brian P. Neal, Bristol, United Kingdom

[73] Assignee: Bendix Limited, Bristol, England

[21] Appl. No.: 263,297

[22] Filed: Oct. 27, 1988

[30] Foreign Application Priority Data

Oct. 31, 1987 [GB] United Kingdom ............... 8725562

[51] Int. Cl.⁴ .......................................... F15B 15/26
[52] U.S. Cl. ........................................ 92/17; 92/63; 92/130 R; 92/133
[58] Field of Search ...................... 92/13.51, 13.8, 17, 92/48, 109, 113, 114, 115, 130 R, 130 A, 133, 62, 63

[56] References Cited

U.S. PATENT DOCUMENTS

| | | | |
|---|---|---|---|
| 3,109,347 | 11/1963 | Brodl et al. | 92/113 |
| 3,152,521 | 10/1964 | Cruse | 92/63 |
| 3,302,530 | 2/1967 | Dobrikin et al. | 92/63 |
| 3,717,072 | 2/1973 | Kaltenthaler et al. | 92/63 |
| 3,983,792 | 10/1976 | Furtner | 92/63 |

FOREIGN PATENT DOCUMENTS

| | | | |
|---|---|---|---|
| 2905211 | 8/1979 | Fed. Rep. of Germany | 92/63 |
| 3243224 | 5/1984 | Fed. Rep. of Germany | 92/133 |
| 2018361 | 10/1979 | United Kingdom | 92/63 |

Primary Examiner—Robert E. Garrett
Assistant Examiner—Thomas Denion
Attorney, Agent, or Firm—Ken C. Decker; William N. Antonis

[57] ABSTRACT

A spring force actuator comprising a housing, an output member axially moveable in the housing, a spring captive between the member and the end wall of the housing. The actuator further comprises an axially located screw-threaded wind-off element operable to apply an opposing force to the spring between the output member and the end wall. The wind-off element is threadedly cooperable with a nut which is non-rotationally captive in an externally accessible recess of the end wall.

4 Claims, 1 Drawing Sheet

SPRING FORCE ACTUATORS

This invention relates to spring force actuators and relates especially to a fluid pressure operable spring force actuator provided with a wind-off feature.

A typical fluid pressure operable spring force actuator comprises a generally cylindrical body with a cylindrical bore within which there is provided a sealingly movable piston which divides the interior of the body into two chambers. One chamber defined between the piston and a closed end of the body operates as a pressure chamber for receiving control pressure, typically compressed air and another chamber defined between the piston and a head or opposite end of the body houses a heavy spring which is under compression between the piston and the head.

In the absence of pressure in the pressure chamber the actuator operates to apply virtually the full force of the spring via the piston to an actuator force output rod and in order to enable removal of the output force in circumstances when no fluid pressure is available, it is known to provide a screw-threaded wind-off member operable from the exterior of the body to compress the spring. Typically, the wind-off member comprises a threaded rod screw threaded in the head and itself being provided with a head which is engageable with the piston such that when rotated from outside the body it moves in a sense to compress the spring.

When such an actuator is utilised as an actuator for vehicle brakes, it is essential that ingress of water, salt or other contaminants shall be prevented because such contaminants cause undue wear and corrosion within the actuator. It is usual to provide a snap-on moulded cover which completely encloses the outward end of the threaded wind-off member. Such cover, therefore, has to be removed in order to use the wind-off mechanism and one disadvantage resides in the fact that the cover ma not be replaced or lost or even inadvertently dislodged in normal service.

One object of the invention is to provide an arrangement wherein such a cover may not be required.

According to the invention there is provided a spring force actuator, comprising a housing an output member axially moveable in the housing, a spring captive between said member and an end wall of the housing operable to apply an output force to said output member, an axially located screw-threaded wind-off element operable to apply an opposing force to the spring between the output member and the end wall to relieve the output member of said output force (characterised in that) said wind-off element being threadedly cooperable with a nut which is non-rotationally captive in an externally accessible recess of the end wall and (in that) retaining means is provided to prevent outward axial movement of said nut.

Preferably, the gasket is sealingly clamped between the sealing member and the housing.

Figure 2:
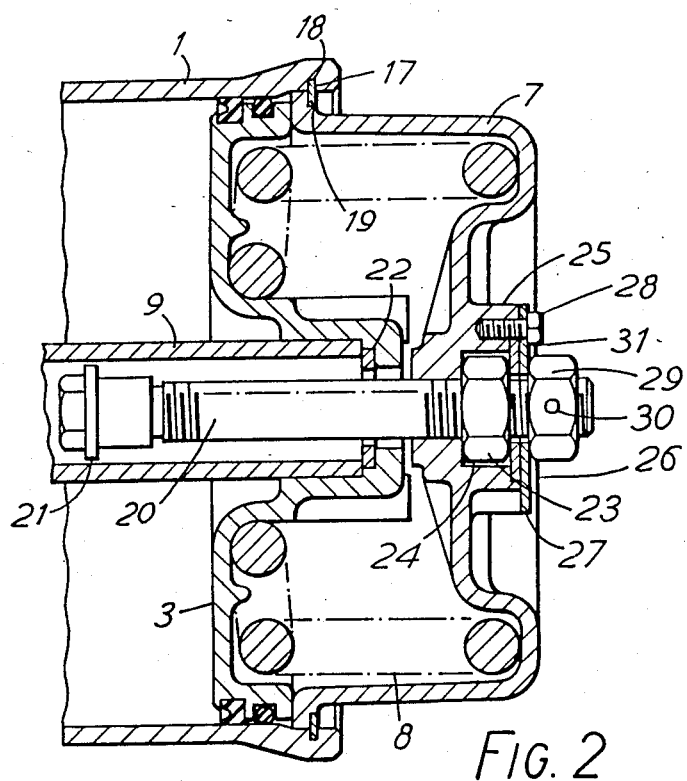

In order that the invention may be more clearly understood and readily carried into effect, the same will be described with reference to the accompanying drawing:

FIG. 1 illustrates a cut away view of a typical compressed air operable spring brake actuator and FIG. 2 illustrates on a larger scale a part sectional view thereof.

Referring to FIG. 1 the compressed air operable spring brake actuator comprises a generally cylindrical housing, denoted by reference 1, having a cylindrical bore 2 within which a piston 3 carrying a peripheral seal 4 is sealingly slideable. The piston 3 divides the cylindrical housing into a first pressure chamber 5 defined between the piston 3 and the enclosed end 6 of the housing and a second non-pressure chamber is defined between the piston 3 and a head 7 which comprises a closure of the other end of the housing. Trapped between the piston 3 and the end provided by head 7, there is a heavy spring 8, continuously under compression. The piston 3 has a tubular output rod 9 which extends through a seal 10 in the enclosed end and comprises an output member which acts via a pressure pad 11 against a diaphragm 12. The diaphragm 12 in its turn rests against a push plate 13 attached to the inner end of a force output rod 14. The diaphragm 12 provides the pressure responsive member of a separately operable actuator portion which responds to a compressed air signal being applied to a separate compressed air input port (not shown). With the piston 3 in the position shown and with full compressed air pressure in chamber 5, the separate actuator portion is thereby able to operate the output rod 14 independently such that the diaphragm 12 moves away from the member 11.

As shown in the drawing the separately operable actuator has a relatively light return spring captive in the non-pressure side thereof, this spring being denoted by reference 15. The chambers containing 8 and 15 are interconnected by a simple external breather pipe 16 in known manner.

The arrangement generally described above is a well known type of combined spring and air operable brake actuator for use as a service and secondary parking actuator of a braking system.

Referring more specifically to the end of the actuator (FIG. 2) provided by the head portion 7, and which encloses the heavy spring 8, this head portion is retained in the main body portion 1 by means of an internal circlip denoted by reference 17 which is located, on the one hand, in an internal groove 18 of the body 1 and, on the other hand, in an annular recess 19 of the head portion. The head portion is thereby immovably trapped in the absence of means for compressing it into the cylindrical part of the housing to permit release of the circlip. Furthermore, the head portion 7 is provided with a wind-off element in the form of a screw threaded bolt 20 having a head with a shoulder 21. In accordance with known practice, this shoulder thereof is able to bear against a thrust member 22 within the piston 3 such that when the bolt is screwed outwardly of the housing, the bolt engages 22 and carries the full force of the spring 8, such force thereby being removed from the output rod 14.

In accordance with the invention, the bolt 20 threadedly engages with a nut 23 which is captive in a correspondingly shaped recess 24 in a central boss 25 of the head portion 7. The recess 24 is accessible from outwardly of the head portion 7, the nut being axially positioned therein together with a thread gasket 26, by means of a retaining plate 27 held in position by three screws 28, one of which is shown. The outward threaded end of the bolt 20 is provided with a nut 29 located thereon by means of a through-pin 30 which is substantial enough to permit turning of the bolt by means of the nut 29. The thickness and hardness of the gasket 26 which is moulded of rubber is chosen to enable its periphery under the effect of screws 28 to be under slight compression in an annular recess 31 in the boss 25 and the central aperture of the gasket is provided with a thread-form whereby it sealingly engages and seals off the exterior part of the bolt 20 and thus provides efficient sealing against ingress of moisture or other contaminants to the interior of the actuator. Furthermore, tightening of the nut 29 to a secure normal running positioning can be sufficient to exert a suitable compression force between nuts 23 and 29 thereby enhancing the sealing effect around the screw threaded bolt 20.

Referring briefly to the operation, as is broadly well known, service braking is effected by a compressed air brake system applying a brake pressure air to the chamber between diaphragm 12 and wall 6 of the housing. In normal running conditions moreover the bolt 20 is in the position shown in FIG. 2 and the chamber 5 is pressurised such that piston 3 is in the position shown with the spring 8 in the fully compressed state. In parking or secondary braking full or partial release of pressure in chamber 5 allows the piston 3 to move under the influence of spring 8 to apply a force via tube 9 to the diaphragm assembly rod 14. In order to manually release the parking brake a suitable tool is applied to the hexagon of external nut 29 to turn the wind-off bolt 20 in a sense to bring shoulder 21 into engagement with thrust member 22 and further turning can retract the piston against the force of spring 8 such as to remove the spring force from the tubular rod 9. Before normal running is resumed the wind-off bolt 20 has to be returned to the position shown and the holdoff pressure in chamber 5 is restored.

By virtue of the present invention it is not necessary to provide any further removable sealing cap or other means around the wind-off mechanism of a spring brake actuator. Furthermore, it is unnecessary to provide any critically machined surfaces or threads in the head portion 7. The inner nut 23 and the gasket 26 are each located in unmachined cast-in recesses in the casting of 7 and screws 28 can be of a self-tapping variety in suitable sized holes in 7.

I claim:

1. A spring force actuator comprising a housing, an output member movable axially in said housing, said housing having an end wall, a spring captive between said member and said end wall, said spring being operable to apply an output force to said output member, a threaded wind-off element coaxial with the housing and extending through said end wall for engagement with the output member to apply an opposing force to the spring to relieve the output member of said output force, a nut having a polygonal cross section threadedly engaging said wind-off element, means carried on said end wall defining a recess through which the wind-off element extends, said recess defining an opening accessible from the exterior of the housing, said nut being received in said recess through said opening, said recess having a polygonal cross section compatible with the cross section of said nut to prevent rotation of the nut relative to the housing when the nut is received within the recess, and retaining means cooperating with the nut and the recess to prevent axial movement of the nut relative to the housing.

2. A spring force actuator as claimed in claim 1, wherein said retaining means is a plate closing the opening defined by said recess to prevent axial movement of the nut out of said opening, said wind-off element extending through said plate.

3. A spring force actuator as claimed in claim 1, wherein a gasket is located between the retaining means and the nut to prevent environmental contaminants from entering the recess.

4. A spring force actuator as claimed in claim 2, wherein a gasket is located between the plate and the nut to prevent environmental contaminants from entering the recess.

* * * * *